United States Patent
Sankar et al.

(10) Patent No.: US 12,220,662 B2
(45) Date of Patent: Feb. 11, 2025

(54) DEHYDRATION OF A MIXTURE CONTAINING A DIOL WITH HIGH WATER CONTENT USING OPTIMIZED PERVAPORATION PROCESS

(71) Applicant: SABIC GLOBAL TECHNOLOGIES B.V., Bergen op Zoom (NL)

(72) Inventors: Ashwin Ravi Sankar, Bangalore (IN); Deepak Sharma, Bangalore (IN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 641 days.

(21) Appl. No.: 17/419,197

(22) PCT Filed: Jan. 9, 2020

(86) PCT No.: PCT/IB2020/050152
§ 371 (c)(1),
(2) Date: Jun. 28, 2021

(87) PCT Pub. No.: WO2020/144621
PCT Pub. Date: Jul. 16, 2020

(65) Prior Publication Data
US 2022/0062824 A1 Mar. 3, 2022

Related U.S. Application Data

(60) Provisional application No. 62/790,407, filed on Jan. 9, 2019.

(51) Int. Cl.
*B01D 61/36* (2006.01)
*B01D 69/02* (2006.01)
(Continued)

(52) U.S. Cl.
CPC ......... *B01D 61/3621* (2022.08); *B01D 69/02* (2013.01); *B01D 69/08* (2013.01);
(Continued)

(58) Field of Classification Search
CPC .... B01D 61/3621; B01D 69/02; B01D 69/08; B01D 69/141; B01D 69/148;
(Continued)

(56) References Cited

U.S. PATENT DOCUMENTS 5,236,474 A 8/1993 Schofield et al.
5,559,254 A 9/1996 Krug et al.
(Continued)

FOREIGN PATENT DOCUMENTS

CN 1644518 7/2005
CN 1845781 A * 10/2006 ........... B01D 53/225
(Continued)

OTHER PUBLICATIONS

Office Action Issued in Counterpart Chinese Application No. 202080019682.4 issued Apr. 29, 2023.
(Continued)

*Primary Examiner* — Waqaas Ali
(74) *Attorney, Agent, or Firm* — Norton Rose Fulbright US LLP

(57) ABSTRACT

Systems and methods for dehydrating a mixture of organic liquid and water are disclosed. A mixture of the organic liquid and water is fed to a membrane. The mixture is then subjected to process conditions sufficient to cause pervaporation. A permeate comprising a higher weight percentage of water than the weight percentage of water in the mixture is recovered. A retentate comprising a higher weight percentage of organic liquid than the weight percentage of the organic liquid in the mixture is also recovered.

20 Claims, 2 Drawing Sheets

(51) Int. Cl.
  *B01D 69/08* (2006.01)
  *B01D 69/14* (2006.01)
  *B01D 71/02* (2006.01)
(52) U.S. Cl.
  CPC ......... *B01D 69/141* (2013.01); *B01D 69/148* (2013.01); *B01D 71/027* (2013.01); *B01D 2325/04* (2013.01)
(58) Field of Classification Search
  CPC .............. B01D 71/027; B01D 2325/04; B01D 69/1411; B01D 61/362
  See application file for complete search history.

(56) References Cited

U.S. PATENT DOCUMENTS

| | | | |
|---|---|---|---|
| 6,789,288 | B2 | 9/2004 | Wijmans et al. |
| 7,235,704 | B2 | 6/2007 | Grund et al. |
| 2012/0074065 | A1 | 3/2012 | Satou |
| 2013/0079509 | A1 | 3/2013 | Mattila et al. |
| 2015/0251140 | A1 | 9/2015 | Ong et al. |

FOREIGN PATENT DOCUMENTS

| | | | | |
|---|---|---|---|---|
| CN | 101060913 | | 10/2007 | |
| CN | 102139188 | | 8/2011 | |
| CN | 102186780 | A * | 9/2011 | .............. B01D 3/14 |
| CN | 102701327 | | 10/2012 | |
| CN | 103224456 | | 7/2013 | |
| CN | 103224456 | A * | 7/2013 | |
| CN | 103649032 | | 3/2014 | |
| CN | 103894066 | | 7/2014 | |
| CN | 104470879 | | 3/2015 | |
| CN | 104582819 | | 4/2015 | |
| CN | 104722208 | | 6/2015 | |
| EP | 0013834 | A2 * | 8/1980 | |
| EP | 532905 | | 3/1993 | |

OTHER PUBLICATIONS

Ahmad et al., "Hybrid process (pervaporation-distillation): a review" *Int. J. Sci. Eng. Res.* 2012, 3(5), p. 1-5.
Bae et al., "Pervaporation Dehydration of Organic Liquids Using Composite Membranes Based on Carboxymethylcellulose." *FIBER* 1996, 52(12), 650-656.
Boutikos et al., "Performance evaluation of silica membrane for water-n-butanol binary mix" *Separation and Purification Technology* 2014, 127, 18-28.
Bruijn et al., "Influence of the support layer on the flux limitation in pervaporation" *Journal of Membrane Science* 2003, 223, 141-156.
Chen et al., "Toward improved hydrophilicity of polymers of intrinsic microporosity for pervaporation dehydration of ethylene glycol" *Separation and Purification Technology* 2017, 174, 166-173.
Huang et al., "Separation of Ethylene Glycol-Water Mixtures Using Sulfonated Poly(ether ether ketone) Pervaporation Membranes: Membrane Relaxation and Separation Performance Analysis" *Ind. Eng. Chem. Res.* 2002, 41, 2957-2965.
International Search Report and Written Opinion issued in Corresponding PCT Application No. PCT/IB2020/050152, dated Mar. 26, 2020.
Nam et al., "Pervaporation of ethylene glycol-water mixtures—1. Pervaporation performance of surface crosslinked chitosan membranes" *Journal of Membrane Science* 1999, 153, 155-162.
Nik et al., "Separation of Ethylene Glycol/Water Mixtures using NaA Zeolite Membranes" *Chem. Eng. Technol.* 2006, 29(11), 1340-1346.
Pereira et al., "Batch and continuous studies for ethyl lactate synthesis in a pervaporation membrane reactor" *Journal of Membrane Science* 2010, 361, 43-55.
Samanta et al., "Separation of acid-water mixtures by pervaporation using nanoparticle filled mixed matrix copolymer membranes" *J Chem Technol Biotechnol* 2012, 15 pages.
Schleger et al., "Module arrangement for solvent dehydration with silica membranes" *Desalination* 2004, 163(1-3), 281-286.
Sommer et al., "Influence of operation parameters on the separation of mixtures by pervaporation and vapor permeation with inorganic membranes. Part 1: Dehydration of solvents" *Chemical Engineering Science* 2005, 60(16), 4509-4523.
Sommer et al., "Performance evaluation of microporous inorganic membranes in the dehydration of industrial solvents" *Chemical Engineering and Processing* 2005, 44, 1138-1156.
Tanardi et al., "Coupled-POMS grafted mesoporous [gamna]-alumina membranes for solvent nanofiltration" *Separation and Purification Technology* 2016, 169, 223-229.
Marin, et al. "Pervaporation process membrane conditioning and experimental mass transfer analysis", *Journal of Membrane Science*, vol. 71, 1992.
Office Action issued in corresponding Chinese Application No. 202080019682.4, dated Jan. 16, 2024.

\* cited by examiner

DEHYDRATION OF A MIXTURE CONTAINING A DIOL WITH HIGH WATER CONTENT USING OPTIMIZED PERVAPORATION PROCESS

CROSS REFERENCE TO RELATED APPLICATIONS

This application is a national phase under 35 U.S.C. § 371 of International Application No. PCT/IB2020/050152, filed Jan. 9, 2020, which claims the benefit of priority of U.S. Provisional Patent Application No. 62/790,407, filed Jan. 9, 2019, each of which are hereby incorporated by reference in their entirety.

FIELD OF INVENTION

The present invention generally relates to liquid separation technologies. More specifically, the present invention relates to systems and methods for separating a water and organic liquid mixture using pervaporation processes.

BACKGROUND OF THE INVENTION

Separation of liquid mixtures is an important process in the chemical industry for purifying products and/or recovering unreacted materials. Conventionally, distillation has been the most widely used technique for separating liquid components. However, several drawbacks, including high energy demand, large steam consumption, and low separation efficiency per pass, limit the economic viability of distillation.

Separation of water and organic compounds such as diols, alcohols, and polyols generally requires an extremely large amount of energy. Because of formation of azeotropes, the high heat capacity of water, and/or close boiling point range between water and the organic compounds, multi-stage distillation that involves a series of distillation columns with high reflux rate is often employed. Therefore, both capital expenditure and operational costs for distillation of water-organic compound mixtures are generally high. Other techniques such as reverse osmosis, ultrafiltration, and nanofiltration have been explored as alternatives for separating water and organic compounds. However, upscaling of these techniques to a commercial-scale process has been technically challenging due to factors such as low separation factor, low flux, and/or loss of products.

Overall, while systems and methods for separating water and organic compounds exist, the need for improvements in this field persists in light of at least the aforementioned drawbacks for the conventional methods.

BRIEF SUMMARY OF THE INVENTION

A solution to at least some of the above-mentioned problems associated with the conventional methods for separating water and organic compounds has been discovered. The solution resides in a method of dehydrating a mixture of organic liquid and water using a membrane under process conditions sufficient to cause pervaporation. This can be beneficial for at least reducing the energy consumption and capital expenditure required for separating the organic liquid and water compared to distillation. Notably, the method is capable of achieving a high membrane flux level, resulting in a low requirement for membrane surface area. Furthermore, the method is carried out such that the membrane has a high separation factor for water and organic liquid including diol, alcohol, and/or polydiols, resulting in reduced loss of product. Moreover, the method of the present invention is more scalable to a commercial-scale process than other membrane based separation methods. Therefore, the method of the present invention provides a technical solution to at least some of the problems associated with the currently available methods for separating water and organic liquid.

Embodiments of the invention include a method of dehydrating a mixture of organic liquid and water. The method comprises feeding the mixture to a membrane. The mixture comprises a minimum of 85 wt. % water and a maximum of 15 wt. % organic liquid. The method further comprises subjecting the mixture in the membrane to process conditions sufficient to cause pervaporation. The process conditions comprise a temperature in a range of 85 to 160° C. The method further comprises recovering a permeate comprising a higher wt. % of water than the wt. % of water in the mixture and a retentate comprising a higher wt. % of organic liquid than the wt. % of the organic liquid in the mixture.

Embodiments of the invention include a method of dehydrating a mixture of organic liquid and water. The method comprises feeding the mixture to a membrane. The mixture comprises a minimum of 85 wt. % water and a maximum of 15 wt. % organic liquid. The method further comprises subjecting the mixture in the membrane to process conditions sufficient to cause pervaporation. The process conditions comprise a temperature in a range of 85 to 160° C. and a pressure in a range of 3 to 8 bar. The method further comprises recovering a permeate comprising a higher wt. % of water than the wt. % of water in the mixture and a retentate comprising a higher wt. % of organic liquid than the wt. % of the organic liquid in the mixture.

Embodiments of the invention include a method of dehydrating a mixture of glycol and water. The method comprises feeding the mixture to a membrane. The mixture comprises a minimum of 85 wt. % water and a maximum of 15 wt. % organic liquid. The method further comprises subjecting the mixture in the membrane to process conditions sufficient to cause pervaporation. The process conditions comprise a temperature in a range of 85 to 160° C. and a pressure in a range of 3 to 8 bar. The method further comprises recovering a permeate comprising a higher wt. % of water than the wt. % of water in the mixture and a retentate comprising a higher wt. % of organic liquid than the wt. % of the organic liquid in the mixture.

The following includes definitions of various terms and phrases used throughout this specification.

The terms "about" or "approximately" are defined as being close to as understood by one of ordinary skill in the art. In one non-limiting embodiment the terms are defined to be within 10%, preferably, within 5%, more preferably, within 1%, and most preferably, within 0.5%.

The terms "wt. %", "vol. %" or "mol. %" refers to a weight, volume, or molar percentage of a component, respectively, based on the total weight, the total volume, or the total moles of material that includes the component. In a non-limiting example, 10 moles of component in 100 moles of the material is 10 mol. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification, includes any measurable decrease or complete inhibition to achieve a desired result.

The term "effective," as that term is used in the specification and/or claims, means adequate to accomplish a desired, expected, or intended result.

The term "pervaporation," as that term is used in the specification and/or claims, means a process for separation of a liquid mixture by partial vaporization of the mixture through a membrane. Pervaporation combines permeation and vaporization.

The use of the words "a" or "an" when used in conjunction with the term "comprising," "including," "containing," or "having" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The process of the present invention can "comprise," "consist essentially of," or "consist of" particular ingredients, components, compositions, etc., disclosed throughout the specification.

The term "primarily," as that term is used in the specification and/or claims, means greater than any of 50 wt. %, 50 mol. %, and 50 vol. %. For example, "primarily" may include 50.1 wt. % to 100 wt. % and all values and ranges there between, 50.1 mol. % to 100 mol. % and all values and ranges there between, or 50.1 vol. % to 100 vol. % and all values and ranges there between.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

For a more complete understanding, reference is now made to the following descriptions taken in conjunction with the accompanying drawings, in which.

DETAILED DESCRIPTION OF THE INVENTION

Currently, distillation is used for separating organic liquid and water when purifying organic liquid. Additionally, organic liquid and water can also be separated using reverse osmosis, ultrafiltration, and/or nanofiltration on a limited scale. However, these existing methods have several problems. Distillation of mixtures of organic liquid and water generally consumes a large amount of energy and requires multiple distillation columns in series due to the formation azeotropes between water and the organic liquid. Thus, the operational costs can be high when distillation is used for separating mixtures of organic liquid and water. Reverse osmosis, ultrafiltration, and/or nanofiltration require less energy than distillation. However, using these methods in an industrial scale is challenging because of the limited separation factors (SF), and requirement of large membrane surfaces. The present invention provides a solution to these problems. The solution is premised on a method of dehydrating a mixture of organic liquid and water. The method involves separating water from organic liquid using one or more membranes via pervaporation. This method requires less energy than distillation. Furthermore, the capital expenditure for using this method is lower than distillation, which requires a series of distillation columns. Additionally, compared to conventional reverse osmosis, ultrafiltration, and/or nanofiltration, this method is capable of improving separation efficiency of the membranes and increasing flux per unit area of membranes, resulting in scalability to commercial production. These and other non-limiting aspects of the present invention are discussed in further detail in the following sections.

A. Membrane Module for Separating Organic Liquid and Water Via Pervaporation

Figure 1:
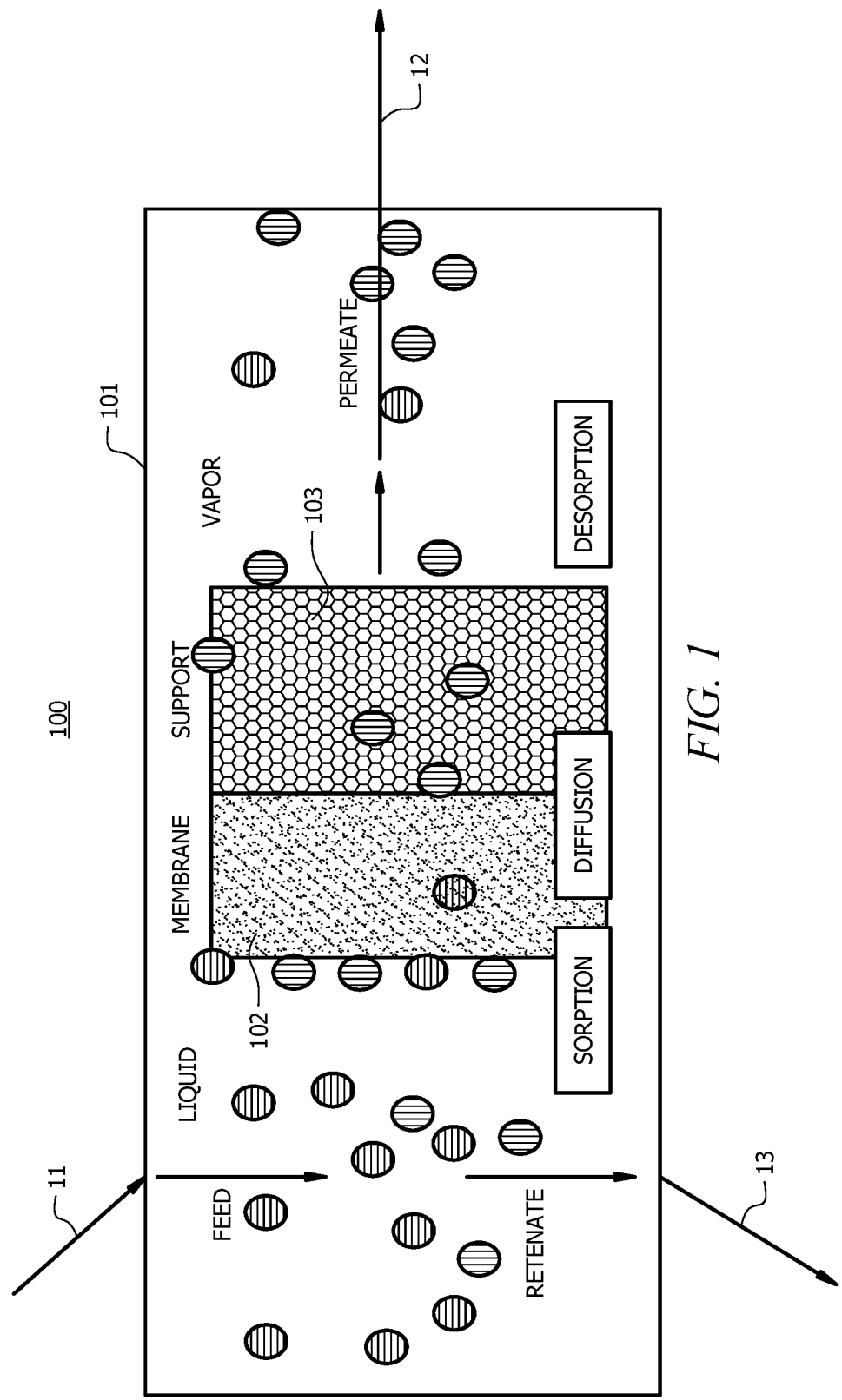
FIG. 1 shows a schematic diagram of a separation process via pervaporation, according to embodiments of the invention.

In embodiments of the invention, the pervaporation system used for separating mixture of organic liquid and water can include one or more membrane modules. With reference to FIG. 1, a schematic diagram is shown for membrane separation module 100 that is capable of separating organic liquid from water with reduced energy consumption and high separation efficiency compared to conventional systems for separating a mixture of organic liquid and water. According to embodiments of the invention, membrane separation module 100 comprises a frame-and-plate structure, a tubular type module, a series-parallel network structure, a core-shell structure, a hollow fiber structure, or combinations thereof.

According to embodiments of the invention, membrane separation module 100 may comprise frame 101. In embodiments of the invention, frame 101 is adapted to contain one or more membranes 102. According to embodiments of the invention, frame 101 is further adapted to receive mixture of organic liquid and water stream 11 therein and release permeate stream 12 and/or retentate stream 13 therefrom. In embodiments of the invention, permeate stream 12 may be released downstream of membrane(s) 102. Retentate stream 13 may be released upstream of membrane(s) 102. In embodiments of the invention, permeate stream 12 comprises primarily water. Retentate stream 13 may comprise primarily the organic liquid. According to embodiments of the invention, membrane separation module 100 further comprises support 103 disposed against membrane 102. Support 103 may be adapted to support membrane 102 so that membrane(s) 102 stays stationary. In embodiments, support 103 is disposed at a side of membrane 102 distal from mixture of organic liquid and water stream 11. Non-limiting examples of support 103 may include polyvinyl alcohol, polysulfone, silica, polyimide, zeolite, and combinations thereof.

In embodiments of the invention, membrane(s) 102 is adapted to allow vapor of the organic liquid to pass through and substantially stop water from passing through. Membrane(s) 102 may include one or more flat sheet membranes, one or more hollow fiber membranes, or a combination thereof. According to embodiments of the invention, each membrane 102 has a thickness of 10 nm to 10 mm and all ranges and values there between including ranges of 10 nm to 20 nm, 20 to 30 nm, 30 to 40 nm, 40 to 50 nm, 50 to 60 nm, 60 to 70 nm, 70 to 80 nm, 80 to 90 nm, 90 to 100 nm, 100 to 200 nm, 200 to 300 nm, 300 to 400 nm, 400 to 500 nm, 500 to 600 nm, 600 to 700 nm, 800 to 900 nm, 900 to 1000 nm, 1000 to 2000 nm, 2000 nm to 3000 nm, 3000 to 4000 nm, 4000 to 5000 nm, 5000 to 6000 nm, 6000 to 7000 nm, 7000 to 8000 nm, 8000 to 9000 nm, 9000 to 10 μm, 10 to 100 μm, 100 to 500 μm, 500 μm to 1 mm, 1 to 2 mm, 2 to 3 mm, 3 to 4 mm, 4 to 5 mm, 5 to 6 mm, 6 to 7 mm, 7 to 8 mm, 8 to 9 mm, 9 to 10 mm. Each membrane 102 may have a pore size in a range of 0.01 angstrom to 10 μm and all ranges and values there between including the ranges of 0.01 to 0.1 angstrom, 0.1 to 1 angstrom, 1 angstrom to 1 nm, 1 to 10 nm, 10 to 20 nm, 20 to 40 nm, 40 to 60 nm, 60 to 80 nm, 80 to 100 nm, 100 to 200 nm, 200 to 400 nm, 400 to 600 nm, 600 to 800 nm, 800 nm to 1 μm, 1 to 2 μm, 2 to 3 μm, 3 to 4 μm, 4 to 5 μm, 5 to 6 μm, 6 to 7 μm, 7 to 8 μm, and 9 to 10 μm. In embodiments of the invention, membrane(s) 102 comprise one or more organic polymeric membranes, one or more ceramic membranes, one or more zeolite membranes, one or more hybrid membranes, or combinations thereof. Non-limiting examples of organic polymeric membranes include chitosan membranes, polyvinyl alcohol (PVA) membranes, polyamides membranes, polyimides membranes, polyacrylonitrile membranes, polyacrylic acid membranes, cellulose acetate membranes, polyblock-ether-amide membranes, polyurethane membranes, polydimethyl siloxane (PDMS) membranes, and combinations thereof. Non-limiting examples for ceramic membranes include silica membranes, alumina membranes, zirconia membranes, and combinations thereof. Non-limiting examples for zeolite membranes include silicalite-1 membranes, ZSM-5 membranes, zeolite NaA membranes, zeolite-Y membranes, and combinations thereof. Hybrid membranes may include membranes comprising silica in polymeric matrix (e.g., HYBSI® membrane, Netherlands), polymeric mixed matrix membranes, or combinations thereof. Membrane(s) 102 may include a membrane from Vito® (Belgium), and/or a membrane from Alfa Laval® (USA).

According to embodiments of the invention, the organic liquid in mixture of organic liquid and water stream 11 may include one or more organic chemicals having one or more hydroxyl groups. In embodiments of the invention, the organic liquid includes alcohol, diol, aldehydes, organic chlorides, organic sulphates, a bisphenol A (BPA) and phenol mixture, an acetic acid and hydrochloric acid mixture, a methanol-toluene mixture, toluene, tetrahydrofuran (THF), a dimethyl carbonate and methanol mixture, or combinations thereof. In embodiments of the invention, one or more membrane separation modules 100 can form a separation unit that is used in an industrial dehydration process for mixtures of organic liquid and water.

B. Method for Dehydrating Mixture(s) of Organic Liquid and Water

Methods of dehydrating a mixture of organic liquid and water have been discovered. The methods may include a pervaporation process to separate water and the organic liquid. In a pervaporation process, upstream of the membrane can be in contact with a liquid mixture feed. The component that displays affinity to the membrane (the permeate) can be turned into vapor, which diffuses/permeates through the membrane on the permeate side when slight vacuum or sweeping gas is applied. The permeate component can be converted into an evaporation phase due to the low (partial) vapor pressure on the permeate side. The permeate may be re-condensed to a liquid. Pervaporation essentially can consist of the steps of vaporization, optionally sorption and adsorption, permeation and/or diffusion, desorption and vaporization followed by re-condensation.

Figure 2:
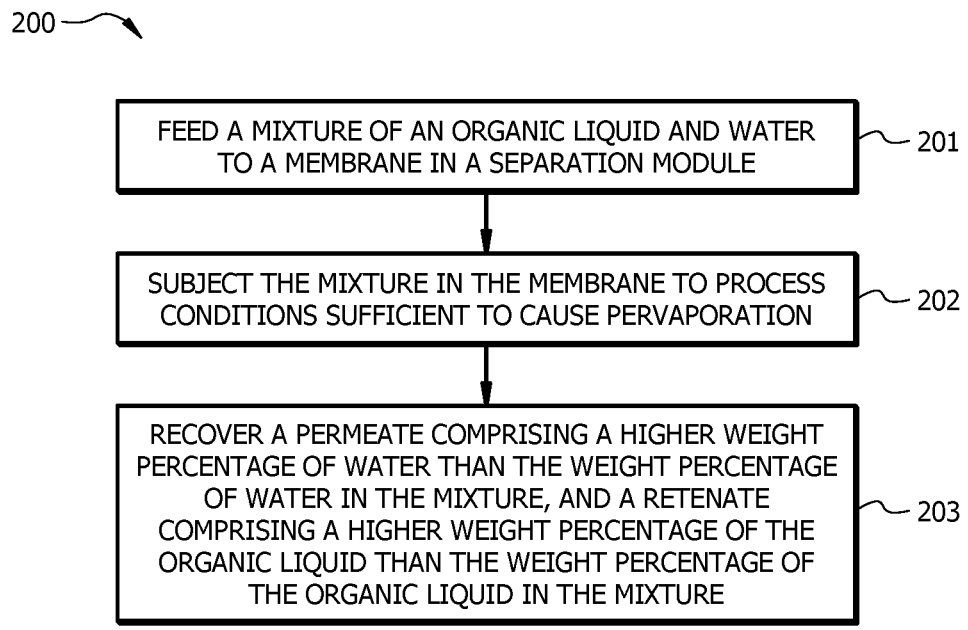
FIG. 2 shows a schematic flowchart for a method of dehydrating a mixture of organic liquid and water, according to embodiments of the invention.

As shown in FIG. 2, embodiments of the invention include method 200 for dehydrating a mixture of organic liquid and water. Method 200 may be implemented by separation module 100, as shown in FIG. 1 and described above. According to embodiments of the invention, as shown in block 201, method 200 comprises feeding mixture of organic liquid and water stream 11 to membrane(s) 102 of separation module 100. In embodiments of the invention, mixture of organic liquid and water stream 11 comprises a minimum of 85 wt. % water and a maximum of 15 wt. % organic liquid. As described above, the organic liquid in mixture of organic liquid and water stream 11 may include alcohol, diol, aldehydes, organic chlorides, organic sulphates, a bisphenol A (BPA) and phenol mixture, an acetic acid and hydrochloric acid mixture, a methanol-toluene mixture, toluene, tetrahydrofuran (THF), a dimethyl carbonate and methanol mixture, or combinations thereof. Membrane(s) 102 may include one or more flat sheet membranes, one or more hollow fiber membranes, or a combination thereof.

In embodiments of the invention, the feeding at block 201 results in a flux in membrane(s) in a range of 10 to 40 $kg \cdot m^2 \cdot hr^{-1}$ and all ranges and values there between including ranges of 10 to 12 $kg \cdot m^2 \cdot hr^{-1}$, 12 to 14 $kg \cdot m^2 \cdot hr^{-1}$, 14 to 16 $kg \cdot m^2 \cdot hr^{-1}$, 16 to 18 $kg \cdot m^2 \cdot hr^{-1}$, 18 to 20 $kg \cdot m^2 \cdot hr^{-1}$, 20 to 22 $kg \cdot m^2 \cdot hr^{-1}$, 22 to 24 $kg \cdot m^2 \cdot hr^{-1}$, 24 to 26 $kg \cdot m^2 \cdot hr^{-1}$, 26 to 28 $kg \cdot m^2 \cdot hr^{-1}$, 28 to 30 $kg \cdot m^2 \cdot hr^{-1}$, 30 to 32 $kg \cdot m^2 \cdot hr^{-1}$, 32 to 34 $kg \cdot m^2 \cdot hr^{-1}$, 34 to 36 $kg \cdot m^2 \cdot hr^{-1}$, 36 to 38 $kg \cdot m^2 \cdot hr^{-1}$, and 38 to 40 $kg \cdot m^2 \cdot hr^{-1}$. In embodiments of the invention, each membrane separation module 100 comprises 1 to 500 membranes 102 and all ranges and values there between including 1 to 5, 5 to 10 to 15, 15 to 20, 20 to 25, 25 to 30, 30 to 35, 35 to 40, 40 to 45, 45 to 50, 55 to 60, 60 to 65, 65 to 70, 70 to 75, 75 to 80, 80 to 85, 85 to 90, 90 to 95, 95 to 100, 100 to 150, 150 to 200, 200 to 250, 250 to 300, 300 to 350, 350 to 400, 400 to 450, and 450 to 500. Each membrane 102 may comprise a contacting surface with mixture of organic liquid and water stream 11 in a range of 0.001 to 1 $m^2$ and all ranges and values there between including ranges of 0.001 to 0.005 $m^2$, 0.005 to 0.01 $m^2$, 0.01 to 0.05 $m^2$, 0.05 to 0.1 $m^2$, 0.1 to 0.2 $m^2$, 0.2 to 0.3 $m^2$, 0.3 to 0.4 $m^2$, 0.4 to 0.5 $m^2$, 0.5 to 0.6 $m^2$, 0.6 to 0.7 $m^2$, 0.7 to 0.8 $m^2$, 0.8 to 0.9 $m^2$, 0.9 to 1 $m^2$. In embodiments of the invention, at block 201, mixture of organic liquid and water stream 11 is flowed at a flow rate of 80 to 1200 kg/hr per membrane module 100 and all ranges and values there between including ranges of 80 to 90 kg/hr, 90 to 100 kg/hr, 100 to 150 kg/hr, 150 to 200 kg/hr, 200 to 250 kg/hr, 250 to 300 kg/hr, 300 to 350 kg/hr, 350 to 400 kg/hr, 375 to 400 kg/hr, 400 to 450 kg/hr, 450 to 500 kg/hr, 500 to 550 kg/hr, 550 to 600 kg/hr, 575 to 600 kg/hr, 600 to 650 kg/hr, 650 to 700 kg/hr, 700 to 750 kg/hr, 750 to 800 kg/hr, 800 to 850 kg/hr, 850 to 900 kg/hr, 900 to 950 kg/hr, and 950 to 1000 kg/hr and 1000 to 1200 kg/hr.

According to embodiments of the invention, method 200 further comprises subjecting the mixture of organic liquid and water stream 11 in membrane 102 to process conditions sufficient to cause pervaporation, as shown in block 202. In embodiments of the invention, the subjecting step at block 202 further causes vapor permeation. In embodiments of the invention, the process conditions comprise a temperature in the range of 85 to 160° C. and all ranges and values there between including ranges of 85 to 90° C., 90 to 95° C., 95 to 100° C., 100 to 105° C., 105 to 110° C., 110 to 115° C., 115 to 120° C., 120 to 125° C., 125 to 130° C., 130 to 135° C., 135 to 140° C., 140 to 145° C., 145 to 150° C., 150 to 155° C., and 155 to 160° C.

The process conditions at block 202 may further include a feed pressure of in a range of 3 to 8 bar and all ranges and values there between including ranges of 3 to 3.5 bar, 3.5 to 4.0 bar, 4.0 to 4.5 bar, 4.5 to 5.0 bar, 5.0 to 5.5 bar, 5.5 to 6.0 bar, 6.0 to 6.5 bar, 6.5 to 7.0 bar, 7.0 to 7.5 bar, and 7.5 to 8.0 bar. According to embodiments of the invention, process conditions at block 202 can include a vacuum on a permeate side of membrane 102 in a range of 20 to 250 mbar and all ranges and values there between including ranges of 20 to 30 mbar, 30 to 40 mbar, 40 to 50 mbar, 50 to 60 mbar, 60 to 70 mbar, 70 to 80 mbar, 80 to 90 mbar, 90 to 100 mbar, 100 to 110 mbar, 110 to 120 mbar, 120 to 130 mbar, 130 to 140 mbar, 140 to 150 mbar, 150 to 160 mbar, 160 to 170 mbar, 170 to 180 mbar, 180 to 190 mbar, 190 to 200 mbar, 200 to 210 mbar, 210 to 220 mbar, 220 to 230 mbar, 230 to 240 mbar, and 240 to 250 mbar.

In embodiments of the invention, method 200 may include, prior to subjecting at block 202, soaking membrane 102 with a soaking liquid. In embodiments, the soaking liquid comprises 25 to 30 wt. % organic components of mixture of organic liquid and water stream 11 and all ranges and values there between including 26 wt. %, 27 wt. %, 28 wt. %, and 29 wt. %. The soaking liquid may further include 70 to 75 wt. % water and all ranges and values there between including 71 wt. %, 72 wt. %, 73 wt. %, and 74 wt. %. The soaking liquid may further include about 50 ppm acetaldehyde and/or about 50 ppm acetic acid. According to embodiments of the invention, the soaking of membrane 102 is carried out at a temperature of 100 to 125° C., including all ranges and values there between including 100 to 102° C., 102 to 104° C., 104 to 106° C., 106 to 108° C., 108 to 110° C., 110 to 112° C., 112 to 114° C., 114 to 116° C., 116 to 118° C., 118 to 120° C., 120 to 122° C., 122 to 124° C., and 124 to 125° C. The soaking of membrane may be carried out for a duration of 3 to 3.5 hours, including all ranges and values there between including 3.1 hours, 3.2 hours, 3.3 hours, and 3.4 hours.

According to embodiments of the invention, as shown in block 203, method 200 further comprises recovering a permeate of permeate stream 12 comprising a higher weight percentage (wt. %) of water than the weight percentage (wt. %) of water in mixture of organic liquid and water stream 11, and a retentate of retentate stream 13 comprising a higher weight percentage (wt. %) of organic liquid than the weight percentage (wt. %) of the organic liquid in mixture of organic liquid and water stream 11. In embodiments of the invention, permeate stream 12 comprises 90 to 99.9 wt. % water, including all ranges and values there between, including ranges of 90 to 90.5 wt. %, 90.5 to 91.0 wt. %, 91.0 to 91.5 wt. %, 91.5 to 92.0 wt. %, 92.0 to 92.5 wt. %, 92.5 to 93.0 wt. %, 93.0 to 93.5 wt. %, 93.5 to 94.0 wt. %, 94.0 to 94.5 wt. %, 94.5 to 95.0 wt. %, 95.0 to 95.5 wt. %, 95.5 to 96.0 wt. %, 96.0 to 96.5 wt. %, 96.5 to 97.0 wt. %, 97.0 to 97.5 wt. %, 97.5 to 98.0 wt. %, 98.0 to 98.5 wt. %, 98.5 to 99.0 wt. %, 99.0 to 99.5 wt. %, and 99.5 to 99.9 wt. %. In embodiments, retentate stream 13 comprises 20 to 99 wt. % of the organic liquid, including all ranges and values there between including ranges of 20 to 25 wt. %, 25 to 30 wt. %, 30 to 35 wt. %, 35 to 40 wt. %, 40 to 45 wt. %, 45 to 50 wt. %, 50 to 55 wt. %, 55 to 60 wt. %, 60 to 65 wt. %, 65 to 70 wt. %, 70 to 75 wt. %, 75 to 80 wt. %, 80 to 85 wt. %, 85 to 90 wt. %, 90 to 95 wt. %, 95 to 99 wt. %. In embodiments of the invention, recovering at block 203 comprises cooling, a second stage membrane recovering, extraction, divided wall distillation, reactive distillation, electrochemical processes, crystallization, adsorption, stripping, or combinations thereof.

In embodiments of the invention, separation module 100 can be used for vapor permeation without vaporization of liquid in the membrane(s). In a vapor permeation process without vaporization of liquid in the membrane(s), the feed stream is in vapor form when it comes in contact with the membrane(s) of separation module 100.

Although embodiments of the present invention have been described with reference to blocks of FIG. 2, it should be appreciated that operation of the present invention is not limited to the particular blocks and/or the particular order of the blocks illustrated in FIG. 2. Accordingly, embodiments of the invention may provide functionality as described herein using various blocks in a sequence different than that of FIG. 2.

As part of the disclosure of the present invention, specific examples are included below. The examples are for illustrative purposes only and are not intended to limit the invention. Those of ordinary skill in the art will readily recognize parameters that can be changed or modified to yield essentially the same results. Dehydration of monoethylene glycol and water mixture was performed using a Pervatech® membrane in a pilot pervaporation plant. The membrane comprises silica in polymeric matrix, Hybrid Silica Hybsi® from ECN, polymeric mixed matrix membrane, PDMS and polyetherimide. Other materials, which can be used, include PVA, chitosan, polyamides, polyimides, PAN, polyacrylic acid, cellulose acetate, PDMS, polyblock-ether-amides, polyurethanes, ceramic, silica, alumina, zirconia, zeolite membranes, hydrophilic (zeolite NaA, Y) or hydrophobic (silicalite-1, ZSM-5).

EXAMPLES

Example 1

Pervaporation Experiment for Separating Monoethylene Glycol in a Pilot Scale

Dehydration of monoethylene glycol and water mixture was performed using a Pervatech® membrane in a pilot pervaporation plant. Each module in the pilot plant included 10 membrane tubes. Each membrane tube had an outer diameter of 10.04 mm and inner diameter of 6.5 mm. The wall thickness for each membrane tube was 1.89 mm. The contacting area of each membrane tube was about 46.9 cm$^2$. The membrane comprises silica in polymeric matrix, Hybrid Silica Hybsi® from ECN, polymeric mixed matrix membrane, PDMS, or polyetherimide. The feed concentration of monoethylene glycol was in a range of 10 to 80 wt. %. The flowrate was fixed at 100 L/hr. The feed temperature was in a range of 60 to 120° C. The feed pressure was set in a range of 1-5 bar. The vacuum on the permeate side of the membrane was about 70 mbar. Cooling water used for recovering the permeate was at about 5° C. The results indicate that the optimized conditions for pervaporation include a feed temperature of 120° C., a feed pressure of about 5 bar, a flow rate of 100 L/hr, and a flux of 12.5 kg·m$^2$·hr$^{-1}$. Further tests were also done and the results are shown in Table 1.

TABLE 1

Results of dehydration of a mixture of monoethylene glycol and water
Pilot plant Trials

| Flow rate(Liter per hour) | 150 | 175 | 177 | 153 | L/hr |
|---|---|---|---|---|---|
| Temperature (deg. C) | 80 | 105 | 130 | 134 | deg. C. |
| Pressure (bar) | 3 | 4 | 5 | 6 | bar |
| Permeate volume (mL) | 274.00 | 405.41 | 429.55 | 420.00 | mL |
| Permeate weight (gm) | 271.26 | 401.40 | 425.30 | 429.00 | gm |
| Permeate density (g/mL) | 0.99 | 0.99 | 0.99 | 0.99 | g/mL |
| Permeate MEG % by GC (wt %) | 1.07 | 0.86 | 0.26 | 0.12 | wt % |
| Water purity (Permeate side wt %) | 98.93 | 99.14 | 99.74 | 99.88 | wt % |
| Membrane flux | 25.64 | 37.94 | 41.09 | 43.27 | kg/m2.hr |
| Feed MEG % by GC | 15.70 | 10.62 | 6.31 | 3.70 | wt % |
| Separation Factor | 17.22 | 13.70 | 25.84 | 31.98 | |
| Pervaporation Separation Index (PSI) | 415.85 | 481.73 | 1020.57 | 1086.59 | kg/m2.hr |

Example 2

Simulations on Dehydration of a Monoethylene Glycol and Water Mixture

A hybrid model was built in Aspen Plus® platform to simulate the separation of monoethylene glycol and water mixture via pervaporation. The hybrid model used parameters of both the solution-diffusion model and the pore flow model to calculate the permeate flux. No presumption was made about the state of the components within the membrane phase.

In order to determine the state of the components in the membrane phase, in the model, the components in the membrane were assumed to exist in an imaginary phase. When the pressure of the imaginary phase exceeded the saturation pressure of the diffusing components, it was in liquid state. The imaginary phase was in vapor state when the imaginary phase had a pressure less than the saturation pressure. The flux and concentration in the membrane phase was considered to follow the solution-diffusion model when it was liquid. Furthermore, in the membrane phase corresponding to the liquid section, the diffusivity is independent of concentration. Whereas, in the vapor section, the diffusivity was considered to be increasing exponentially with concentration. The results for the simulations on dehydration of a mixture of monoethylene glycol and water are shown in Table 2.

TABLE 2

Simulation results on dehydration of monoethylene glycol and water mixture
Simulation Runs

| Flow rate(Litre per hour) | 160 | 200 | 500 | 570 | L/hr |
|---|---|---|---|---|---|
| Temperature | 85 | 140 | 150 | 160 | deg. C. |
| Pressure | 3.5 | 6.5 | 5 | 8.5 | bar |
| Permeate volume | 257.00 | 430.26 | 483.79 | 521.16 | mL |
| Permeate weight | 254.43 | 426.00 | 479.00 | 516.00 | gm |
| Permeate density | 0.99 | 0.99 | 0.99 | 0.99 | g/mL |
| Permeate MEG % by simulation | 1.05 | 0.16 | 0.12 | 0.06 | wt % |
| Water purity (Permeate side wt %) | 98.95 | 99.84 | 99.88 | 99.94 | wt % |
| Membrane flux | 24.05 | 40.26 | 46.28 | 49.86 | kg/m$^2$.hr |
| Feed MEG % (Basis)[wt %] | 15.00 | 4.00 | 6.31 | 3.70 | wt % |
| Separation Factor | 16.6303 | 26 | 56.0575 | 63.9976 | |
| Pervaporation Separation Index (PSI) | 375.879 | 1006.62 | 2548.07 | 3140.75 | kg/m$^2$.hr |

Example 3

Pervaporation Experiment for Separating Monoethylene Glycol in a Pilot Scale

Dehydration of monoethylene glycol and water mixture was performed using a Pervatech® Acid Resistant HybSi membrane in a pilot pervaporation plant. Each module in the pilot plant included 8 membrane tubes arranged in series-configuration. Each membrane tube had an outer diameter of 10.04 mm and inner diameter of 6.5 mm. The wall thickness for each membrane tube was 1.89 mm. The contacting area of each membrane tube was about 46.9 cm$^2$. The membrane was the same as in Example 1. The feed concentration of monoethylene glycol was in a range of 4.2 to 18.2 wt. %. The flowrate was varied at 200, 375, 575 and 1200 L/hr. The feed temperature was in a range of 122 to 155° C. The feed pressure was set in a range of 2.5 to 6 bar. The vacuum on the permeate side of the membrane ranged between 50 to 300 mbar. Cooling water used for recovering the permeate was at about 5° C. The results indicate improvement as 1) the glycol feed concentration in feed reduced and 2) the temperature of the feed increased. The separation can be scaled up and has been demonstrated to larger flow rates. All data results in tables are provided for separation obtained per single tube. Additional data is provided in Table 3 below.

TABLE 3

Results of dehydration of a mixture of monoethylene glycol and water

| Temperature (° C.) | 122 | 143 | 147 | 155 |
|---|---|---|---|---|
| Pressure (bar) | 2.5 | 3.5 | 5 | 6 |
| Permeate volume (mL) | 2855.00 | 7489.00 | 19890.00 | 45010.00 |
| Permeate weight (gm) | 2826.45 | 7414.85 | 19693.07 | 44667.07 |
| Permeate density (g/mL) | 0.99 | 0.99 | 0.99 | 0.99 |
| Permeate MEG % by GC (wt %) | 0.89 | 0.75 | 0.24 | 0.1 |
| Water purity (Permeate side wt %) | 99.11 | 99.25 | 99.76 | 99.90 |
| Membrane flux (Kg/m$^2$.hr) | 50.18 | 87.75 | 102.32 | 146.39 |
| IFeed MEG % by GC (wt %) | 18.20 | 16.40 | 7.40 | 4.20 |
| Separation Factor | 24.78 | 25.96 | 33.22 | 43.80 |
| Pervaporation Separation Index (PSI) (Kg/m$^2$.hr) | 1193.01 | 2190.31 | 3296.47 | 6265.01 |
| Time of Run (Hours) | 12 | 18 | 41 | 65 |

TABLE 4

Tube dimensions for Example 3

| Area of Experimental Membrane tube (Single tube) | mm | cm | |
|---|---|---|---|
| Outer direction | 10.04 | 1.004 | Area (per tube) units |
| Inner direction | 6.5 | 0.65 | 46.9 cm$^2$ |
| Wall thickness | 1.89 | 0.189 | 0.004694 m$^2$ |
| Height | 23 | 2.3 | |

Example 4

Additional simulations were conducted in accordance with Example 3. The results are shown in Table 4 below.

TABLE 5

Simulation results on dehydration of monoethylene glycol and water mixture

| Flow rate (Litre per hour) | 200 | 400 | 600 | 1200 |
|---|---|---|---|---|
| Temperature (° C.) | 120 | 140 | 150 | 160 |
| Pressure (bar) | 3 | 4 | 5 | 6 |
| Permeate volume (mL) | 2455.00 | 8589.00 | 19925.00 | 46120.00 |
| Permeate weight (gm) | 2430.45 | 8503.96 | 19727.72 | 45663.41 |
| Permeate density (g/mL) | 0.99 | 0.99 | 0.99 | 0.99 |
| Permeate MEG % by simulation (wt %) [Aspen Custom Modeling] | 0.92 | 0.8 | 0.3 | 0.15 |
| Water purity (Permeate side wt %) | 99.08 | 99.20 | 99.70 | 99.85 |
| Membrane flux (kg/m$^2$.hr) | 51.77 | 90.58 | 105.06 | 149.65 |
| Feed MEG % (Basis)(wt %) | 20.00 | 15.00 | 8.00 | 4.00 |
| Separation Factor | 26.92 | 21.88 | 28.90 | 27.74 |
| Pervaporation Separation Index (PSI) (kg/m$^2$.hr) | 1342.20 | 1891.47 | 2931.08 | 4001.13 |
| Time of Run (Hours) | 10 | 20 | 40 | 65 |

In the context of the present invention, at least the following 18 embodiments are disclosed. Embodiment 1 is a method of dehydrating a mixture of organic liquid and water. The method includes feeding the mixture to a membrane, wherein the mixture contains a minimum of 85 wt. % water and a maximum of 15 wt. % organic liquid. The method further includes subjecting the mixture in the membrane to process conditions sufficient to cause pervaporation, wherein the process conditions include a temperature in a range of 85 to 160° C. In addition, the method includes recovering a permeate containing a higher wt. % of water than the wt. % of water in the mixture and a retentate containing a higher wt. % of organic liquid than the wt. % of the organic liquid in the mixture. Embodiment 2 is the method of embodiment 1, wherein the process conditions in the subjecting step include a feed pressure in a range of 3 to 8 bar. Embodiment 3 is the method of either of embodiments 1 or 2, wherein the subjecting step further causes vapor permeation. Embodiment 4 is the method of any of embodiments 1 to 3, wherein the organic liquid contains an organic chemical having one or more hydroxyl groups. Embodiment 5 is the method of embodiment 4, wherein the organic liquid comprises BPA-phenol, THF-methanol, acetic acid-HCl, toluene, DMC-methanol, methanol-toluene, alcohol, glycols, polyols, triols, or combinations thereof. Embodiment 6 is the method of any of embodiments 1 to 5, wherein the membrane includes a flat sheet membrane and/or a hollow fiber membrane. Embodiment 7 is the method of embodiment 6, wherein the flat sheet membrane includes membranes adapted for performing nanofiltration, ultrafiltration, reverse osmosis, pervaporation, vapor permeation, or combinations thereof. Embodiment 8 is the method of either of embodiments 6 or 7, wherein the flat sheet membrane is selected from the group consisting of polysulfonamide on polysulfone, polyacrylonitrile, polydimethylsioxane, and combinations thereof. Embodiment 9 is the method of any of embodiments 6 to 8, wherein the flat sheet membrane is configured in a plate-frame structure, a series-parallel network structure, a core-shell structure, or combinations thereof. Embodiment 10 is the method of any of embodiments 6 to 9, wherein the hollow fiber membrane is selected from the group consisting of a hybrid silica membrane, a zeolite membrane, a hybrid ceramic membrane, an organic polymeric membrane, and combinations thereof. Embodiment 11 is the method of any of embodiments 1 to 10, wherein the process conditions include a mixture flow rate of 80 to 1000 kg/hr per membrane module. Embodiment 12 is the method of any of embodiments 1 to 11, wherein the process conditions include a vacuum pressure on permeate side of the membrane in a range of 20 to 250 mbar. Embodiment 13 is the method of any of embodiments 1 to 12, further including, prior to the subjecting step, soaking the membrane with a soaking liquid comprising 25 to 30 wt. % organic components of the mixture, 70-75 wt. % water, about 50 ppm acetaldehyde, and about 50 ppm acetic acid. Embodiment 14 is the method of embodiment 13, wherein the soaking of the membrane is carried out at a temperature of 100 to 125° C. for 3 to 3.5 hours. Embodiment 15 is the method of any of embodiments 1 to 14, wherein the membrane has a flux in a range of 10 to 40 kg·m$^{-2}$·hr$^{-1}$. Embodiment 16 is the method of any of embodiments 1 to 15, wherein the permeate contains 90.0 to 99.9 wt. % water. Embodiment 17 is the method of any of embodiments 16, wherein the retentate contains 20 to 99 wt. % of the organic liquid. Embodiment 18 is the method of any of embodiments 1 to 17, wherein the membrane has a thickness of 10 nm to 1 mm.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method of dehydrating a mixture of organic liquid and water, the method comprising:
    feeding the mixture to a membrane, wherein the mixture comprises a minimum of 85 wt. % water and a maximum of 15 wt. % organic liquid;
    soaking the membrane with a soaking liquid comprising 25 to 30 wt. % of an organic liquid and 70 to 75 wt. % water;
    subjecting the mixture in the membrane to process conditions sufficient to cause pervaporation, wherein the process conditions comprise a temperature in a range of 85 to 160° C.; and
    recovering a permeate comprising a higher wt. % of water than the wt. % of water in the mixture and a retentate comprising a higher wt. % of organic liquid than the wt. % of the organic liquid in the mixture.

2. The method of claim 1, wherein the process conditions in the subjecting step comprise a feed pressure in a range of 3 to 8 bar.
3. The method of claim 1, wherein the subjecting step further causes vapor permeation.
4. The method of claim 1, wherein the organic liquid comprises an organic chemical having one or more hydroxyl groups.
5. The method of claim 4, wherein the organic liquid comprises BPA-phenol, THF-methanol, acetic acid-HCl, toluene, DMC-methanol, methanol-toluene, alcohol, glycols, polyols, triols, or combinations thereof.
6. The method of claim 1, wherein the membrane comprises a flat sheet membrane and/or a hollow fiber membrane.
7. The method of claim 6, wherein the flat sheet membrane comprises membranes adapted for performing nanofiltration, ultrafiltration, reverse osmosis, pervaporation, vapor permeation, or combinations thereof.
8. The method of claim 6, wherein the flat sheet membrane is selected from the group consisting of polysulfonamide on polysulfone, polyacrylonitrile, polydimethylsiloxane, and combinations thereof.
9. The method of claim 6, wherein the flat sheet membrane is configured in a plate-frame structure.
10. The method of claim 6, wherein the hollow fiber membrane is selected from the group consisting of a hybrid silica membrane, a zeolite membrane, a hybrid ceramic membrane, an organic polymeric membrane, and combinations thereof.
11. The method of claim 1, wherein the process conditions comprise a mixture flow rate of 80 to 1000 kg/hr per membrane.
12. The method of claim 1, wherein the process conditions comprise a vacuum pressure on permeate side of the membrane in a range of 20 to 250 mbar.
13. The method of claim 1, wherein the soaking liquid further comprises about 50 ppm acetaldehyde and about 50 ppm acetic acid.
14. The method of claim 13, wherein the soaking of the membrane is carried out at a temperature of 100 to 125° C. for 3 to 3.5 hours.
15. The method of claim 1, wherein the membrane has a flux in a range of 10 to 40 kg·m$^{-2}$·hr$^{-1}$.
16. The method of claim 1, wherein the permeate comprises 90.0 to 99.9 wt. % water.
17. The method of claim 1, wherein the retentate comprises 20 to 99 wt. % of the organic liquid.
18. The method of claim 1, wherein the membrane has a thickness of 10 nm to 1 mm.
19. The method of claim 2, wherein the retentate comprises 20 to 99 wt. % of the organic liquid.
20. The method of claim 2, wherein the membrane has a thickness of 10 nm to 1 mm.

* * * * *